United States Patent [19]

Nakamura et al.

[11] Patent Number: 4,886,135

[45] Date of Patent: Dec. 12, 1989

[54] ENGINE COOLING STRUCTURE FOR AGRICULTURAL TRACTOR

[75] Inventors: Tadashi Nakamura; Satoshi Fujita; Eiichi Ishida, all of Sakai, Japan

[73] Assignee: Kubota, Ltd., Osaka, Japan

[21] Appl. No.: 186,842

[22] Filed: Apr. 27, 1988

[51] Int. Cl.⁴ .............................................. B60K 5/02
[52] U.S. Cl. ................................... 180/68.1; 180/68.6
[58] Field of Search .................. 180/68.1, 68.4, 68.6, 180/68.3, 69.2

[56] References Cited

U.S. PATENT DOCUMENTS

| | | | |
|---|---|---|---|
| 2,820,523 | 1/1958 | Earl | 180/68.1 X |
| 3,762,489 | 10/1973 | Proksch et al. | 180/68.1 |
| 4,081,050 | 3/1978 | Hennessey et al. | 280/5 A X |

FOREIGN PATENT DOCUMENTS

| | | | |
|---|---|---|---|
| 101824 | 6/1983 | Japan | 180/68.1 |
| 2073116 | 10/1981 | United Kingdom | 180/68.1 |

Primary Examiner—Charles A. Marmor
Assistant Examiner—Michael Mar
Attorney, Agent, or Firm—Edwin E. Greigg

[57] ABSTRACT

An engine cooling structure comprises a hood enclosing an engine and defining air inlets and an air outlet, a radiator disposed rearwardly of the engine, a cooling fan disposed forwardly of the engine for drawing cooling air and exhausting the cooling air forwardly. A closed cooling duct system extending from the air inlets to the air outlet is formed by the hood, a guide plate for guiding all incoming air flows to the radiator, and shielding plates extending from a forward body frame and sealing an engine room from below. The cooling air flows through the radiator, past the engine and through the cooling fan.

16 Claims, 2 Drawing Sheets

ENGINE COOLING STRUCTURE FOR AGRICULTURAL TRACTOR

BACKGROUND OF THE INVENTION (1) Field of the Invention

The present invention relates to an engine cooling structure for agricultural tractors.

(2) Description of the Prior Art

A known example of engine cooling structure for agricultural tractors is disclosed in Japanese utility model publication Kokai No. 61-198119. This cooling structure comprises an engine, a forwardly blowing type cooling fan disposed forwardly of the engine, and a radiator disposed forwardly of the cooling fan. Cooling air having passed through the radiator is exhausted from the front of a hood enclosing the engine.

Another known example of engine cooling structure is disclosed in U.S. Pat. No. 4,081,050, in which a forwardly blowing type cooling fan is disposed rearwardly of an engine, and a radiator is disposed rearwardly of the cooling fan and adjacent a driver's seat. In this example, cooling air is drawn through an air inlet disposed adjacent the driver's seat and flows through the radiator and the cooling fan, past the engine, and out through the front of a hood as in the foregoing example.

These known structures in which the cooling air is exhausted from the front of the hood, as distinct from the case of exhausting the cooling air toward the driver's seat, have the advantage that the driver is not subjected to the air moving past and heated by the radiator. However, in the first-mentioned example the radiator is disposed downstream of the engine with respect to cooling air flows, the air heated by the engine acts on the radiator. Since the cooling air for removing heat from the radiator is warmer than cooling air as introduced from the ambient, sufficient heat exchange does not take place at the radiator which has the disadvantage that an increased amount of water must be recirculated through the radiator.

The second known example produces a high cooling effect for the radiator since the cooling air drawn from the ambient through the air inlet acts on the radiator first. However, since no blasting device is provided downstream of the cooling fan, the cooling air moving past the fan is prevented from flowing smoothly and disturbed by the engine having a complicated external configuration. This results in an insufficient amount of air flow thereby impairing the cooling effect. Furthermore, this known structure has the cooling fan located in the vicinity of the driver's seat, which poses the problem of noise to the driver. Such position of the cooling fan is restrictive to the range for providing the air inlet or inlets.

SUMMARY OF THE INVENTION

An object of the present invention is to provide an engine cooling structure for agricultural tractors with a simple arrangement of components, which is capable of cooling the radiator, engine and hood efficiently by maintaining a sufficient rate and amount of cooling air flows while maintaining a low noise level.

In order to achieve the above object, an engine cooling structure according to the present invention comprises an engine, a hood defining air inlets and an air outlet, a radiator disposed rearwardly of the engine and adjacent a driver's seat, a cooling fan mounted on a front face of the engine for drawing cooling air and exhausting the cooling air forwardly, wherein the cooling air flows through the radiator and past the engine and through the cooling fan.

Since the cooling fan is disposed at a forward position in the hood, a position immediately behind the cooling fan has the lowest pressure whereby the air in the hood around the engine tends to have a lower pressure than the ambient. This construction hardly produces a high pressure zone detrimental to smooth flows of the cooling air. Thus the cooling air is allowed to flow in a sufficient amount with little turbulence, thereby to produce a high cooling effect.

Further, the above construction is effective to maintain the noise to a minimum level since the cooling fan is located at a maximum distance to the driver's seat.

The radiator is subjected to the cooling air immediately after its introduction from the ambient. The cooling air in this stage has the lowest temperature and produces an excellent cooling effect. Thus, it is unnecessary to recirculate a large amount of water through the radiator.

Further, since the cooling fan is mounted on the front face of the engine, the cooling air flows having undergone heat exchange with the radiator act on the engine to cool the engine. This construction also permits a space rearwardly of the engine to be readily used, and facilites arrangement of a power takeoff mechanism, for example.

In a preferred embodiment of the invention, the cooling air flows through a passage opening only at the air inlets and the air outlet and extending through a duct construction in substance which is defined by the hood, a guide plate for guiding all cooling air flows entering from the air inlets to the radiator, and shielding plates extending from a forward body frame and sealing an engine room from below.

According to the above construction, the substantially closed cooling air passage checks noise leaks and permits the heated cooling air to be exhausted efficiently by the cooling fan. Thus, this construction promotes the advantage of the forwardly blowing type cooling system.

In a further preferred form, the cooling fan is equipped with a fan shroud for exhausting the cooling air with increased efficiency.

One of the air inlets may be disposed on top of the hood and adjacent the driver's seat, with the radiator inclined forwardly. Then the radiator is cooled efficiently through heat exchange with the incoming cooling air with little loss of flows.

The above construction may include an electric fan disposed downstream of the radiator. This provision will increase suction of the cooling air through the radiator for improved cooling effect.

This electric fan may be operable independently of the engine, which allows residual heat to be promptly removed after the engine is stopped.

Other features and advantages of the present invention will be apparent from the following description of the preferred embodiments.

DESCRIPTION OF THE PREFERRED EMBODIMENTS

Figure 1:
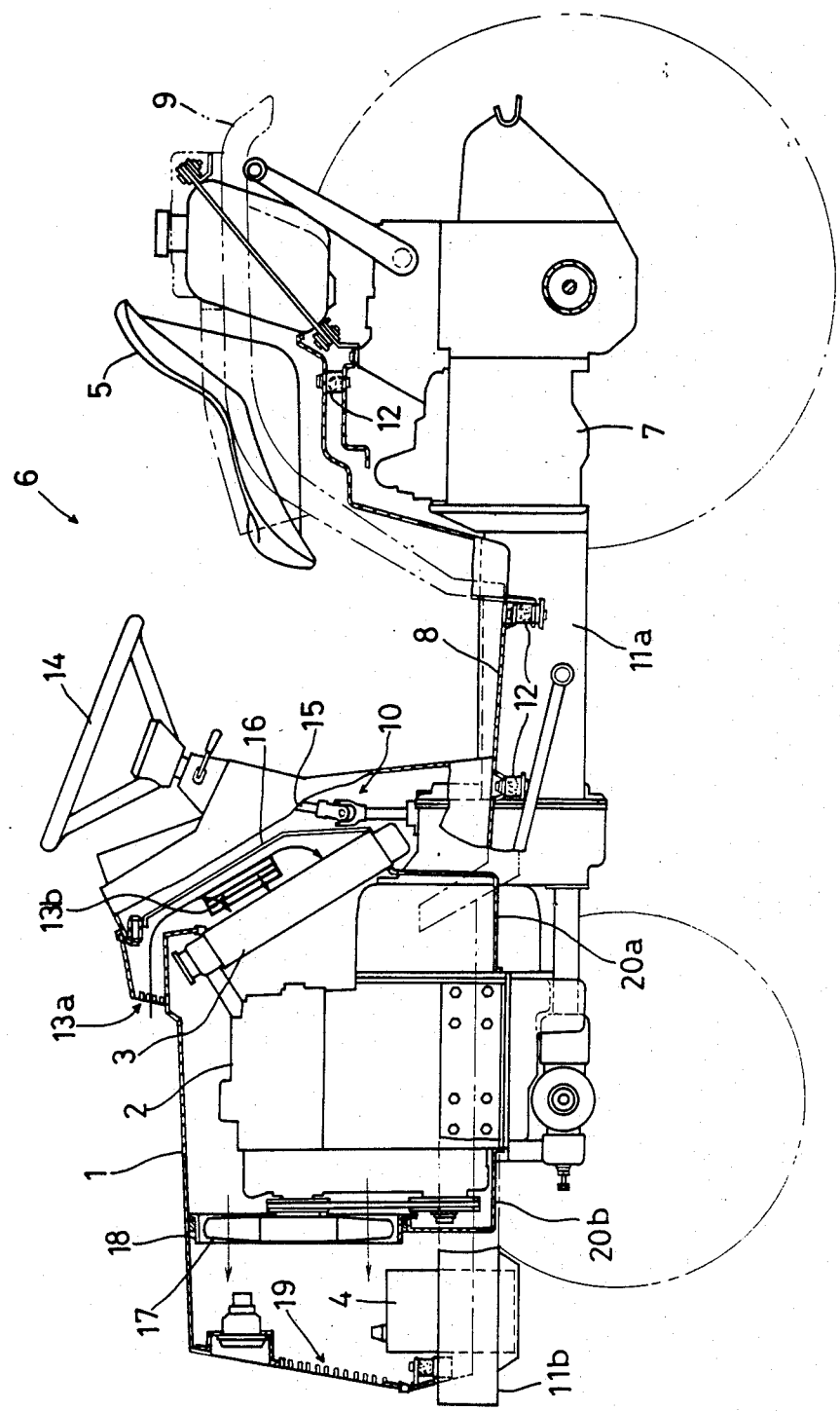
FIG. 1 is a side view, partly in section, of an engine cooling structure for an agricultural tractor according to one embodiment of the present invention.

Referring to FIG. 1, an agricultural tractor is shown therein comprising a hood 1 located at a front position thereof which houses an engine 2, a radiator 3 and a battery 4, a driver's section 6 including a driver's seat 5 disposed at an intermediate position of the tractor, and a transmission case 7 at a rear position of the tractor.

The tractor further comprises a body frame 11 including an intermediate frame portion 11a acting as a power transmitting case and interconnecting the engine 2 and the transmission case 7, and a front frame portion 11b supported by the engine 2 and extending forwardly as a cantilever. The body frame 11 supports the hood 1, a steering shaft covering 10, steps 8 of the driver's section and rear fenders 9 through vibration-absorbing rubber elements 12.

A cooling structure for cooling the engine 2 will be described hereinafter following a cooling air passage. As shown in FIG. 1, cooling air is drawn through air inlets 13a and 13b and exhausted through an air outlet 19 defined in the hood 1. Between the air inlets 13a and 13b and the air outlet 19, the radiator 3, engine 2 and a cooling fan 17 are arranged in the mentioned order under the hood 1. The cooling air is drawn and exhausted by the action of the cooling fan 17. The cooling air passage is defined by the hood 1, a guide plate 16 and shielding plates 20a and 20b constituting a substantially single duct system.

The air inlets 13a and 13b comprise a main inlet 13a defined on a top surface of the hood 1 adjacent the end thereof opposed to the driver's seat 5, and auxiliary inlets 13b defined in opposite lateral surfaces of the hood 1 adjacent the same rearward end thereof. The auxiliary inlets 13b are used when an increased amount of cooling air is required.

The radiator 3 is disposed downstream of these air inlets 13a and 13b so that the radiator 3 is exposed to all of incoming air flows. The air flows are guided to the radiator 3 by part of the hood 1 and by a guide plate 16 extending between the air inlets 13a and 13b and the radiator 3. This guide plate 16 acts also as a partition between a space accommodating a power shaft 15 of a steering wheel 14 and a radiator room. The radiator 3 may be erected upright as in the prior art or may be forwardly inclined as in this embodiment. The forwardly inclined posture is preferable where the air inlet 13a is defined on the top of the hood, since a good cooling effect is produced with the cooling air passage bent to a minimal degree compared with the case of the upright posture.

The engine 2 is disposed downstream of the radiator 3 with respect to the direction in which the cooling air flows, and on a front face of the engine 2 the cooling fan 17 is provided which is the type to direct air flows forwardly. The cooling fan 17 is peripherally surrounded by a fan shroud 18 for guiding the cooling air flows. The shielding plates 20a and 20b are provided to render an engine room to be a sealed space as is the radiator room. The shielding plates 20a and 20b comprise a shielding plate 20a for controlling the air flows between the radiator 3 and engine 2 from below, and a shielding plate 20b for controlling the air flows between the engine 2 and fan shroud 18. These shielding plates 20a and 20b play a part in substantially ducting the cooling air passage. The center of the cooling fan 17 is located upwardly with respect to the front face of the engine in order to produce a good fanning effect.

The above arrangement causes the cooling air flows to undergo heat exchanges with the radiator 3 and engine 2 and thereafter to be exhausted through the air outlet.

Figure 2:
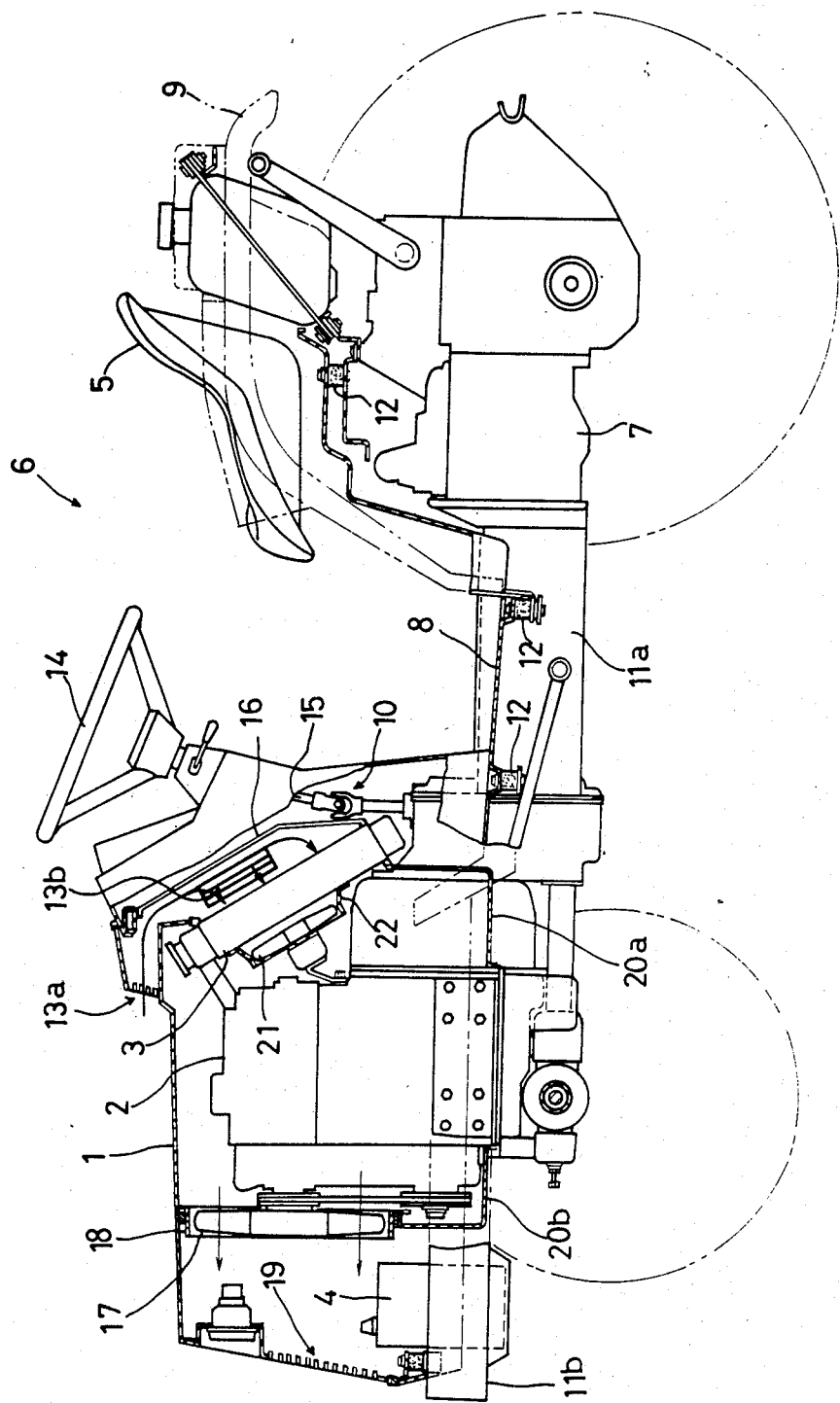
FIG. 2 is a side view, partly in section of an engine cooling structure according to another embodiment in which an electric fan is mounted forwardly of a radiator.

A second embodiment of the invention will be described next with reference to FIG. 2. This embodiment differs from the foregoing embodiment in that an electric fan 21 is provided downstream of the radiator 3. This fan 21 is surrounded by a shroud 22. The cooling structure including the fan 21 which is operable independently of the engine 2 is capable of promptly removing residual heat by the action of the fan 21 after the engine 2 is stopped. The position immediately downstream of the radiator 3 is best suited for accommodating the electric fan 21, but the fan 21 may be disposed at any position in the cooling air passage. The electric fan 21 is ancillary to the cooling fan 17, and may comprise a small and light fan to serve the purpose.

What is claimed is:

1. An engine cooling structure for a vehicle, comprising:
    an engine (2) in an engine compartment located in a forward portion of the vehicle;
    a driver's seat located in a rearward portion of said vehicle;
    a hood (1) having top, side and front portions forming said engine compartment;
    a radiator (3) disposed rearwardly of said engine (2) and forwardly of a steering wheel and steering shaft, the rearward end of the top of said hood being connected to an upper portion of said radiator;
    a cooling fan (17) disposed forwardly of said engine (2) and remotely from said radiator for drawing cooling air and exhausting the cooling air in a forward direction;
    a shroud (18) surrounding said cooling fan (17);
    an air inlet duct formed by a guide plate disposed between said radiator and said steering wheel and steering shaft, a lower end of said guide plate being connected to a lower portion of said radiator, said air inlet duct including an air inlet opening formed by an upper end of said guide plate extending over a rearward portion of the top of said hood;
    a first shielding plate (20a) connected at one end to the lower portion of said radiator (3) and connected at a rear portion of said engine;
    a second shielding plate (20b) connected at one end to a forward portion of said engine and connected at an opposite end to a lower portion of said shroud (18);
    said first and second shielding plates sealing said engine compartment from below, thereby forming an air duct extending from said radiator (3) over and along said engine to said cooling fan (17); and
    an air outlet (19) formed in said hood at the front of said engine compartment, wherein the cooling air flows through the radiator (3), past the engine (2) through the cooling fan (17) and out the engine compartment via air outlet (19).

2. An engine cooling structure as claimed in claim 1, wherein said radiator (3) is inclined forwardly.

3. An engine cooling structure as claimed in claim 1, wherein said cooling fan (17) is secured with a portion of a blade on a higher plane than said engine.

4. An engine cooling structure as claimed in claim 1, which includes an electric fan (21) juxtaposed to and downstream said radiator (3).

5. An engine cooling structure as claimed in claim 2, which includes an electric fan (21) juxtaposed to and downstream said radiator (3).

6. An engine cooling structure as claimed in claim 3, which includes an electric fan (21) juxtaposed and downstream of said radiator (3).

7. An engine cooling structure as claimed in claim 4, wherein said electric fan (21) is surrounded by a fan shroud (22).

8. An engine cooling structure as claimed in claim 5, wherein said electric fan (21) is surrounded by a fan shroud (22).

9. An engine cooling structure as claimed in claim 6, wherein said electric fan (21) is surrounded by a fan shroud (22).

10. An engine cooling structure as claimed in claim 4, wherein said electric fan (21) is operable independently of said cooling fan (17).

11. An engine cooling structure as claimed in claim 5, wherein said electric fan (21) is operable independently of said cooling fan (17).

12. An engine cooling structure as claimed in claim 6, wherein said electric fan (21) is operable independently of said cooling fan (17).

13. An engine cooling structure as claimed in claim 7, wherein said electric fan (21) is operable independently of said cooling fan (17).

14. An engine cooling structure as claimed in claim 8, wherein said electric fan (21) is operable independently of said cooling fan (17).

15. An engine cooling structure as claimed in claim 9, wherein said electric fan (21) is operable independently of said cooling fan (17).

16. An engine cooling structure as claimed in claim 1. wherein said air inlet duct includes air inlet openings (13b) defined in opposite side portions of said air inlet duct.

* * * * *

UNITED STATES PATENT AND TRADEMARK OFFICE
CERTIFICATE OF CORRECTION

PATENT NO.   :   4,886,135
DATED        :   December 12, 1989
INVENTOR(S)  :   TADASHI NAKAMURA et al It is certified that error appears in the above-identified patent and that said Letters Patent is hereby corrected as shown below:

Title page, insert the following:

[30]    Foreign Application Priority Data

May 1, 1987 [JP]  Japan......62-109596

May 6, 1987 [JP]  Japan......62-110247

Signed and Sealed this

Sixteenth Day of October, 1990

Attest:

HARRY F. MANBECK, JR.

*Attesting Officer*        *Commissioner of Patents and Trademarks*